United States Patent
Kögler et al.

(10) Patent No.: US 6,464,229 B1
(45) Date of Patent: Oct. 15, 2002

(54) METHOD AND APPARATUS FOR SEALING A SPACE

(75) Inventors: Markus Kögler, Buchloe; Franz Heimpel, Affing; Silvia Huber, Neusäss; Peter Vogel, Untermeitingen, all of (DE)

(73) Assignee: Hilti Aktiengesellschaft, Schaan (LI)

( * ) Notice: Subject to any disclaimer, the term of this patent is extended or adjusted under 35 U.S.C. 154(b) by 18 days.

(21) Appl. No.: 09/715,549

(22) Filed: Nov. 17, 2000

(30) Foreign Application Priority Data

Nov. 19, 1999 (DE) .......................... 199 55 765

(51) Int. Cl.[7] .................. F16L 21/02; F16L 17/00; F16L 55/00; E04B 1/682; F16J 15/08
(52) U.S. Cl. .................. 277/314; 277/316; 277/603; 277/607; 277/609; 277/627; 277/652; 285/97; 285/196; 285/216; 138/108; 138/112
(58) Field of Search ................ 277/312, 314, 277/316, 602, 603, 607, 609, 616, 627, 628, 630, 633, 637, 644, 647, 652, 654; 285/96, 97, 100, 196, 216; 138/108, 112

(56) References Cited

U.S. PATENT DOCUMENTS

| | | | | |
|---|---|---|---|---|
| 2,774,621 A | * | 12/1956 | Kilbourne, Jr. ............. | 277/649 |
| 3,035,331 A | * | 5/1962 | Wieman ....................... | 29/235 |
| 3,271,039 A | * | 9/1966 | Kohl et al. .................. | 156/148 |
| 4,086,736 A | * | 5/1978 | Landrigan .................... | 248/56 |
| 4,431,198 A | * | 2/1984 | Beinhaur et al. ......... | 174/65 R |
| 4,489,473 A | * | 12/1984 | Nakagami .................... | 138/140 |
| 4,581,804 A | * | 4/1986 | McLaughlin ................. | 138/149 |
| 4,789,164 A | * | 12/1988 | Winter et al. ........... | 174/152 G |
| 5,070,597 A | * | 12/1991 | Holt et al. .................. | 138/103 |
| 5,224,601 A | * | 7/1993 | Gouge et al. ............ | 206/524.7 |
| 5,996,643 A | * | 12/1999 | Stonitsch .................... | 138/143 |
| 6,244,602 B1 | * | 6/2001 | Farm et al. ................. | 210/511 |

* cited by examiner

Primary Examiner—Anthony Knight
Assistant Examiner—Vishal Patel
(74) Attorney, Agent, or Firm—Sidley Austin Brown & Wood, LLP

(57) ABSTRACT

For sealing an annular space or space (4) between an opening (2), in a wall or similar member (1), and an object (3) extending through the opening (2), at least one sealing element (6) is placed in the annular space (4). Initially, the sealing element (6) is placed in the compressed state between the wall (1) and the object (3) and subsequently is released from the compressed state to an expanded state. For this purpose at first, the sealing element (6) is compressed by a sheath (7) which, after the sealing element (6) is positioned in the annular space (4), is destroyed and makes the expansion of the sealing element (6) possible.

14 Claims, 3 Drawing Sheets

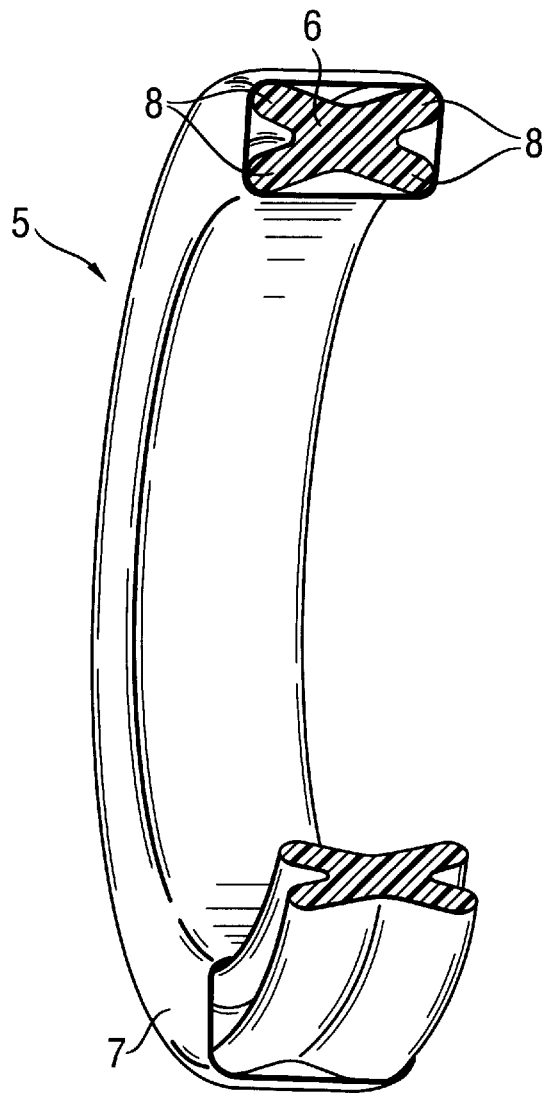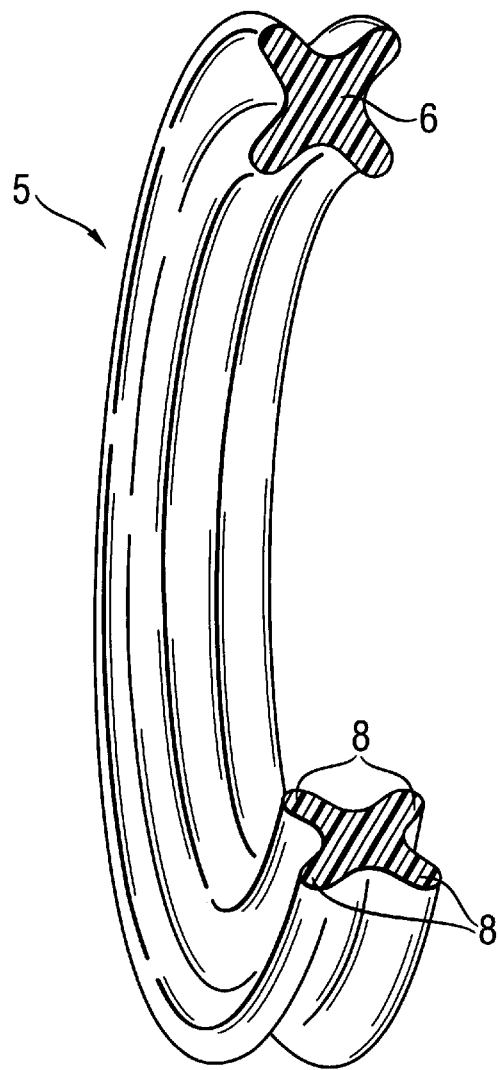

METHOD AND APPARATUS FOR SEALING A SPACE

BACKGROUND OF THE INVENTION

The present invention is directed to a method of sealing a space between an opening through a wall or similar member and an object extending through the opening by placing at least one sealing element in the annular space between the opening and the object, and a sealing devise for effecting the sealing action.

Seals are required for openings into a house where pipes or cables are passed through the openings in the house walls from the outside to the inside. An annular space or space, between the pipe or cable and the wall, can be sealed in different ways. For this purpose, mechanical seals, for example, come into consideration. Accordingly, solid sealing elements fill the annular space and seal it positively or by elastically pressing against the openings. Chemical sealing materials can also be used. The annular space is filled here with a reactive system, which cures or hardens and closes off the annular space. As reactive systems, inorganic systems, such as sealing compounds, polymeric foams, and the like are used. Last, but not least, chemical-mechanical sealing procedures can also be used. For these, the end faces of the annular space usually are closed mechanically and receive a chemical filling system.

However, mechanical solutions are relatively expensive, time consuming and work intensive during the installation and, moreover, are limited to pipes and cables with certain external diameters and to wall openings of certain internal diameters. Chemical solutions, that is, the filling of the annular gap or space with sealing compounds, foams, mortars and the like admittedly do not have these disadvantages; however, they do not, in general, guarantee permanent sealing against the entry of water. Frequently, this is due to the permeability of the material itself and to the deficient adhesion of the sealing material to different critical surfaces, such as polyethylene. There is also the danger that the user does not fill the annular space completely.

SUMMARY OF THE INVENTION

Therefore, it is a primary object of the invention to develop a method and an apparatus of the type mentioned above, so that an opening of the type named can easily be filled rapidly and completely and, with that, can also be sealed permanently.

With respect to the method, this objective is accomplished by inserting an elastic sealing element in the wall opening in a compressed state between the object extending through the opening and the wall surface in the opening and releasing the sealing element from the compressed state for providing the seal. With respect to the apparatus, on the other hand, the invention is accomplished by an elastic sealing element and means for compressing the sealing element with the means being destructible Advantageous developments of the invention are set forth in the dependent claims.

The inventive method for sealing a space between an opening, existing in a wall or similar member, and an object, extending through the opening, by placing at least one sealing element in the annular space where an elastic sealing element is compressed and, in this state, positioned between the wall opening and the object, and that subsequently the sealing element is released from the compressed state and expands.

Accordingly, not only is the placement of the sealing element or the opening or space facilitated, but also, as a result of the expansion of the sealing element at the place of the seal, a reliable and firmly seated barrier against the penetration of moisture or water is also obtained.

Preferably, the sealing element consists of a watertight, compressible and elastic material, such as rubber. The compressibility of the sealing element can be attained either by the material properties themselves, a soft core also being possible, or by the geometric shape of the sealing element.

According to an advantageous development of the invention, the sealing element can be compressed by an external sheath, which is destroyed for the purpose of releasing the compression of the sealing element. For this purpose, the external sheath need only be cut open regionally, so that it tears further as a result of the expansion of the sealing element, which then can fill up the whole of the annular space.

According to a different advantageous development of the invention, the sealing element, which is hollow, porous and airtight at least regionally and welded into a sheath, is compressed by producing a vacuum in the sheath. Because of its reduced size, it can then be introduced relatively easily into space that is to be sealed. For releasing the compression or expanding the sealing element, the sheath is then opened, in order to eliminate the vacuum in the sheath. By these means, the sealing element can also close off the whole of the annular space, sealing it.

The sheath itself may consist of a water-soluble material, so that it is broken down when water enters the annular space and, with that, provides the possibility for the sealing element to expand, in order to seal off the annular space and completely prevent the entry of moisture or water.

The sealing element can be positioned in the annular space in various ways. According to a first variation, it is possible initially to insert the sealing element in a compressed state in the opening, into which the object is then introduced. It is, however, also possible initially to fasten the sealing element to the object and to insert it together with the object into the opening. Last, but not least, the sealing element can also be fastened to the object, which is already present in the opening.

A inventive sealing device for sealing an annular space between an opening, present in the wall and an object, extending through the opening, is distinguished owing to the fact that it has an elastic sealing element and a means for compression, which compresses the sealing element, and that the means for compression can be destroyed. In this connection, the sealing element can be constructed in the form of a tape, so that, depending on the depth of the opening or of the annular space that is to be sealed, it can be wound several times around the object, which leads to a particularly good sealing effect. The sealing element can also be constructed ring-shaped and this simplifies the installation even further.

As already mentioned, the compressibility of the sealing element can also be achieved by its geometric shape. For this purpose, the sealing element may have lips, which can be bent and initially are compressed by the sheath. Later on, when the sheath is destroyed, the lips are released and then ensure that the annular space is sealed.

However, the sealing element can also, at least regionally, be hollow or porous in order to provide the required compression by a vacuum produced in this region. For example, the sealing element may have a soft foam core, in the region of which an evacuation takes place, in order to compress the otherwise elastic sealing element.

Examples of the invention are described in greater detail in the following with reference to the drawing, in which

DESCRIPTION OF THE DRAWING

FIG. 4a shows a ring-shaped sealing element partly in the compressed state and partly in the expanded state; and FIG. 4b shows a ring-shaped sealing element in a sheath.

DESCRIPTION OF THE EMBODIMENT

Figure 1:
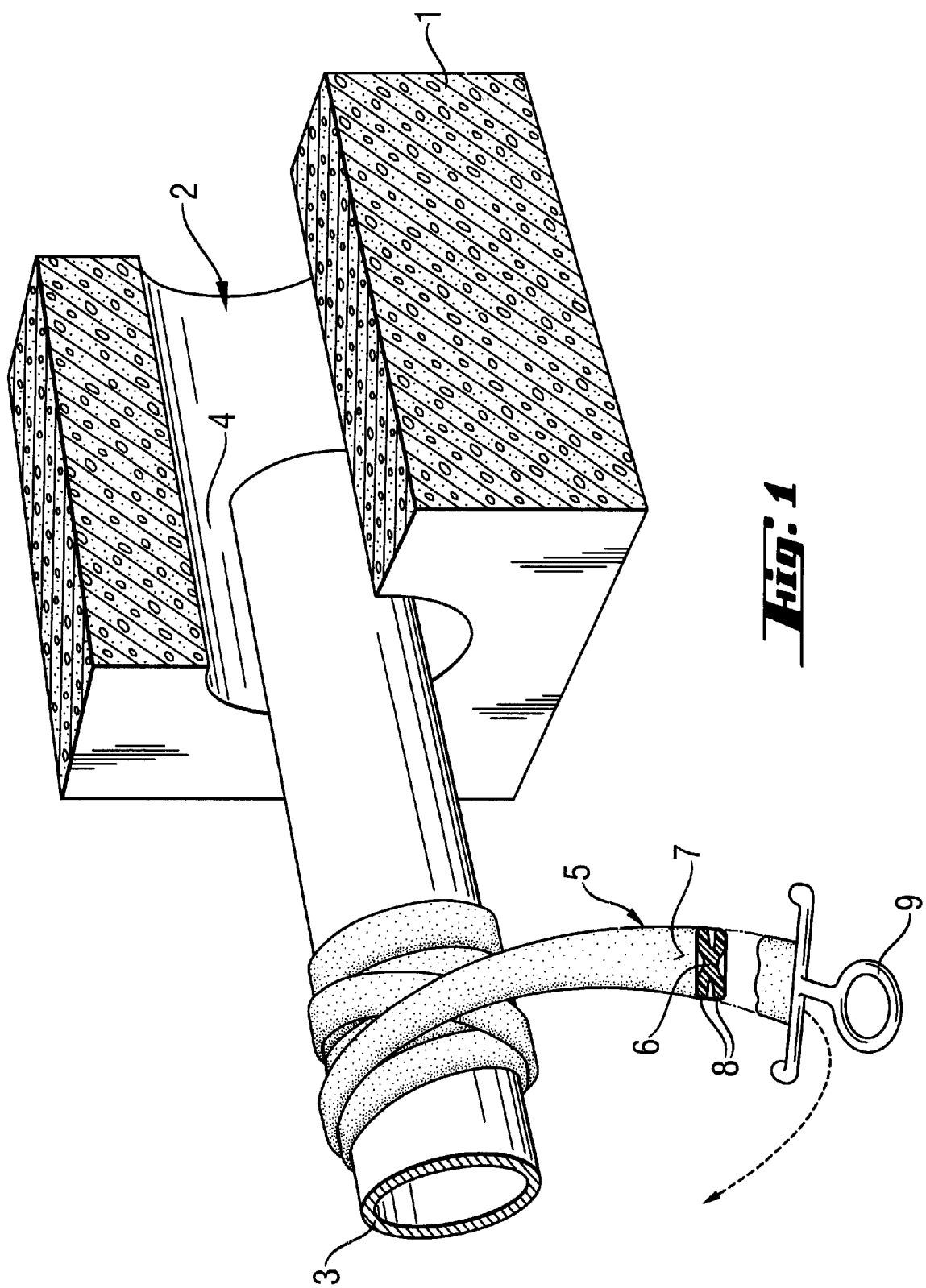
FIG. 1 is a perspective view of a tape-shaped sealing element, embodying the present invention, wound around an object and not yet been positioned in the annular space and is in the compressed state.

In FIG. 1, a portion of a wall is shown. It may be, for example, the wall of a house. Within the wall 1, there is a laterally closed opening 2, through which an object 3 is to be passed. The object 3 may be a cable or a pipe. The internal diameter of the opening 2 is a little larger than the external diameter of the object 3, so that an annular gap or space 4 is present between the two surfaces.

To seal the annular space 4, to begin with, a sealing device 5 is wrapped around the object 3 outside of the annular space. The sealing device 5 is tape-shaped and can be wrapped around the object 3 several times. In this state, the sealing device 5 itself is compressed and is in the form of a flat tape. It consists of an elastic core 6, which is compressed by a sheath 7 enveloping it. The elastic core 6 has four lips 8 extending from a central core and projecting from the core with the lips spaced, from one another and pressed against one another in each case in pairs by the sheath 7. The sealing device 5 is also connected with a slitting-open device 9, which is pulled from the free end of the flat tape and slits open the side of the sheath 7 over an extended region, so that the core 6, with further destruction of the sheath 7, can expand gradually and finally over the whole length of the flat tape 5.

Figure 2:
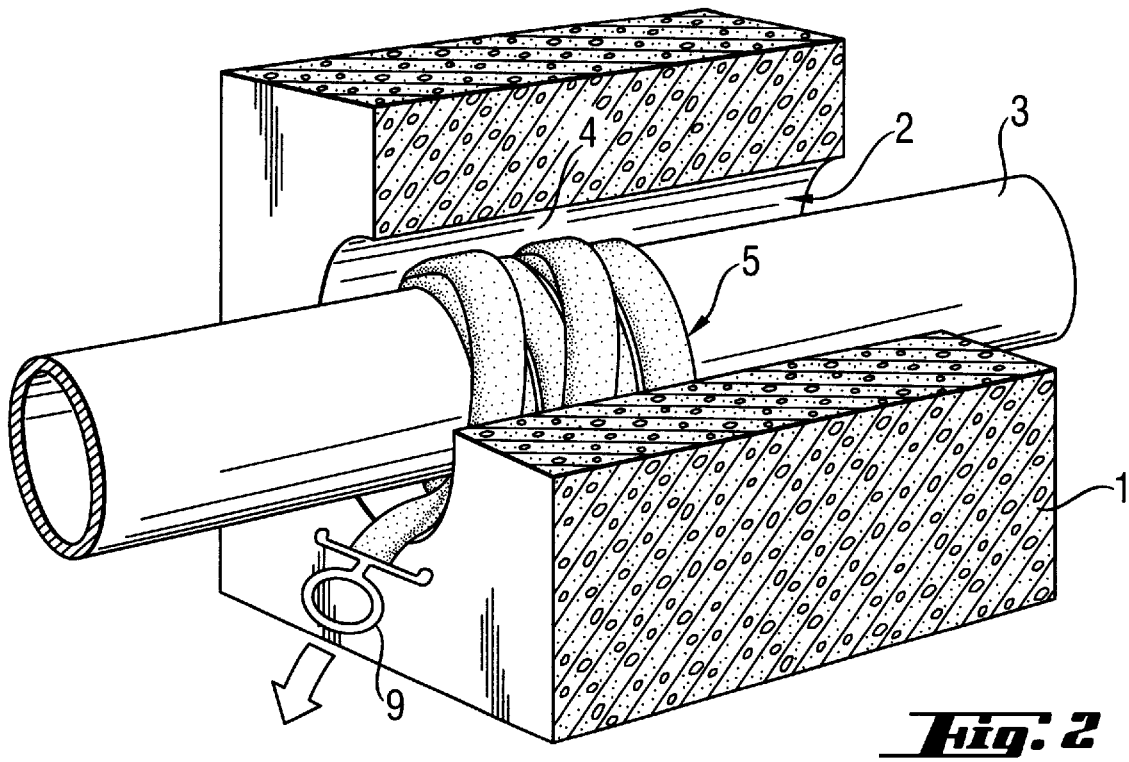
FIG. 2 illustrates the sealing element of FIG. 1 in the annular space and still in the compressed state.
Figure 3:
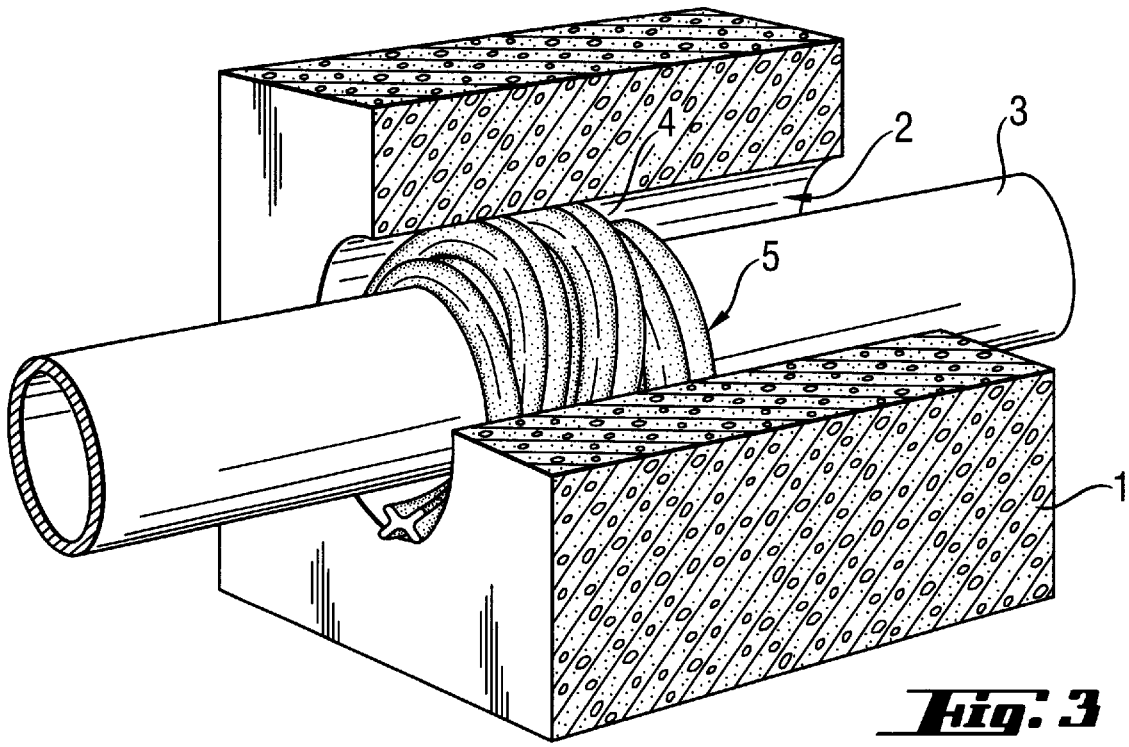
FIG. 3 shows the sealing element in the annular space, however, in the compression released or expanded state.

The sealing device 5, shown in FIG. 1 in the compressed state, initially is pushed into the opening 2, in that the object 3 is introduced into the opening 2. After the sealing device 5 is positioned within the opening 2 as shown in FIG. 2, the slitting-open device 9 is the actuated and the enclosing sheath 7 is destroyed. The core 6 now commences to expand over the whole length of the sealing device 5 and, moreover, with further destruction of the sheath 7, finally the annular space or space 4 is sealed completely by the core 6. This state is shown in FIG. 3. If the sheath 7 is formed of a water soluble material, it is broken down gradually upon entry of moisture into the annular space or space 4, whereupon even further expansion of the core 6 can take place, which leads to an even better sealing of the annular space 4.

A second embodiment of the inventive sealing device 5 is shown in FIG. 4. It is a ring-shaped sealing device with a core 6, which is constructed in the form of a square ring. It has four sealing lips 8, which are compressed in pairs in FIG. 4a by the sheath 7 by compressive force acting in the plane of the ring. If the sheath 7 now is cut or destroyed only in a small peripheral part of the ring, the core 6 can commence to expand there and gradually tears the sheath 7 over the whole extent of the ring, so that finally the state of FIG. 4b is achieved. Here the lips 8, due to the restoring force, are expanded. The sealing element 5 now is in the expanded state and can, if it is disposed in the region of the annular space 4, seal the latter completely and liquid tight.

In the case of one application, a sealing ring of a rubber-like material, ideally in a geometric shape with sealing lips, such as a square ring, is pre-tensioned, that is, compressed from the inside and the outside, the compression force acting in the plane of the ring. The compression is achieved by wrapping a sheet around the ring. The sealing element, so produced, is introduced into an opening and a pipe or a cable is passed through the ring-shaped sealing element. The pre-tensioning of the sheet is then released. The sealing ring then expand towards the inside as well as towards the outside and seals the existing annular space liquid-tight. The sheet is water-soluble.

A tape-shaped sealing element is used for a different embodiment. The tape was is a butyl tape with a core of polyurethane foam and a sheath of an elastic material. To reinforce the sealing action, the sheath may consist, for example, of butyl, which is glued to the core. The tape-shaped element had a compressible core of soft foam. In this case, the pre-tensioning is produced by welding the tape into a sheath and evacuating the sheath. Due to the resulting reduced pressure in the soft foam core, the tape is compressed. It is then wound around a pipe or a cable and compressed and inserted into a wall opening, which is to be sealed off. After the sealing tape is positioned in the opening, the vacuum within the sheet is removed, so that the sealing tape expands. It is possible to close off the existing annular space completely and liquid tight. Here also, the sheath consists of a water-soluble material.

What is claimed as new and desired to be protected by letters patent is set forth in the appended claims.

What is claimed is:

1. A method of liquid tight sealing a space between a laterally closed opening (2) in a wall or similar structure and an object (3) having a diameter smaller than the opening (2) and arranged to extend through the opening, comprising the steps of forming at least one sealing element (6) comprising an elastic sealing element (6) held in a compressed state by an enclosing member, inserting the sealing element and enclosing member in an annular form in the opening (2), inserting the object (3) into the annular form of the sealing element so that the sealing element (6) in the compressed state does not seal an open annular space (4) between the object (3) and the opening (2), releasing the sealing element from the compressed state, by destroying the enclosing member, into an expanded state and providing a liquid tight seal by the sealing element of the open annular space between the opening (2) and the object (3).

2. A method, as set forth in claim 1, comprising the steps of compressing the sealing element (6) within an outer sheath (7) and destroying the outer sheath for releasing the sealing element (6) from the compressed state into the expanded state.

3. A method, as set forth in claim 1, comprising the steps of forming the sealing element (6) at least in part of at least one of a hollow and porous material, enclosing the sealing element in an air-tight sheath, establishing a vacuum within the sheath for placing the sealing element in the compressed state, and releasing the vacuum for releasing the sealing element from the compressed state into the expanded state.

4. A method of liquid tight sealing a space between a laterally closed opening (2) in a wall or similar structure and an object (3) having a diameter smaller than the opening (2) and arranged to extend through the opening (2), comprising the steps of forming at least one sealing element (6) held within an outer sheath (7) in a compressed state, wrapping the sealing element (6) and the outer sheath in the compressed state around the object (3), inserting the object (3) and the sealing element in the compresses state into the opening (2) so that the sealing element does not seal an open annular space between the object (3) and the opening (2), releasing the sealing element from the compressed state by destroying the sheath (7) into an expanded state and providing a liquid tight seal by the sealing element of the open annular space between the opening (2) and the object (3).

5. A method of liquid tight sealing a space between a laterally closed opening (2) in a wall or similar structure and an object (3) having a diameter smaller than the opening (2) and arranged to extend through the opening, comprising the steps of placing the object (3) through the opening (2) so that an open annular space is formed between the object and the opening, forming at least one sealing element (6) held within an outer sheath in a compressed state, placing the compressed sealing element (6) within the outer sheath (7) around the object within the opening (2) so that the sealing element does not seal an open annular space between the object (3) and the opening (2), releasing the sealing element from the compressed state into an expanded state by destroying the sheath (7) and forming a liquid tight seal by the sealing element of the open annular space between the opening (2) and the object (3).

6. A sealing device for sealing an open annular space between a radially outer laterally closed opening (2) through a wall or similar structure (1) and a radially inner object (3) extending through and having a diameter smaller than the opening (2), comprising an elastic sealing element (6) capable of extending circumferentially about said inner object, means for enclosing and compressing said sealing element so that in the compressed state the combined said sealing element (6) and means encloses said object and does not seal said open annular space, and said means comprises a destructible sheath for compressing said sealing element so that upon being destroyed said sealing element expands and forms a liquid tight seal between said object (3) and said laterally closed opening (2).

7. A sealing device, as set forth in claim 6, wherein the sealing element and said sheath has the form of a tape capable of being wound circumferentially around said object (3) and formed in a tape-like manner.

8. A sealing device, as set forth in claim 6, wherein the sealing element (6) and said sheath are formed in the shape of a ring.

9. A sealing device, as set forth in claim 6, wherein said sealing element (6) is an elongated member having a center core with pairs of lips projecting radially outwardly from opposite sides of the center core, with said pairs of lips extending angularly apart and being bendable.

10. A sealing device, as set forth in claim 6, wherein the sealing element (6) is at least in part one of hollow and porous.

11. A sealing device, as set forth in claim 10, wherein said sealing element has a soft foam core.

12. A sealing device, as set forth in claim 10 wherein the means for compressing comprises an air-impermeable sheath (7) capable of being evacuated for compressing the sealing element.

13. A sealing device, as set forth in claim 6, wherein the sheath (7) is formed of a water-soluble material for facilitating the destruction thereof.

14. A sealing device, as set forth in claim 9, wherein said sealing element (6) is formed of a rubber material.

* * * * *